Patented Oct. 29, 1929

1,733,842

UNITED STATES PATENT OFFICE

FERNANDO SOMOZA VIVAS, OF LOS ANGELES, CALIFORNIA, ASSIGNOR TO INTERNATIONAL FIREPROOF PRODUCTS CORPORATION, OF NEW YORK, N. Y., A CORPORATION OF DELAWARE

CLEANSER

No Drawing.  Application filed June 30, 1926. Serial No. 119,751.

The invention relates to a new cleanser for the use of dry cleaners and has as an object to replace the usual explosive materials, such as gasoline, benzine, or ether, used for such purposes, the substitute being non-inflammable.

A further object of the invention is to avoid the ring or mark left in cleaning with the ordinary cleansers, the material provided containing enough nitrogen to produce in combination with the hydrogen an alkaline reaction which saponifies the oil or greasy matter in the clothing to be cleaned.

The formula which it is preferred to use as an embodiment of the invention is as follows:

| | Parts |
|---|---|
| Gasoline | 98 |
| Chlorine | 35 |
| Ammonium carbonate | 7½ |
| Aluminum or molybdenum chloride | 2 |

The gasoline is charged into a lead lined steam-jacketed receptacle, and the ammonium carbonate and the aluminum or molybdenum chloride are mixed therewith. The receptacle is then closed and the chlorine is bubbled through the mixture while the vessel is heated by means of steam in the jacket, at a temperature of substantially 212° F. The heating of the vessel is only necessary for the purpose of hastening the initiation of the reaction as the heat evolved by chemical action is sufficient for carrying out of the process in the presence of the catalyst.

The aluminum or molybdenum chloride acts as a catalyst and the ammonium carbonate is decomposed. The material is heated so as to distil the thus modified gasoline. The moisture is removed from the distillate by passing the same through calcium chloride and any free chlorine is removed by treatment with soda ash.

While the product resulting from the process of the invention has been described for use as a cleanser, it is obvious that it may also be used as a solvent for use in paints and varnishes, the characteristics which make the same of use as a cleanser, namely the cutting of greases, paints, and the like from fabrics, making it also desirable for dissolving such substances when used as a thinner or solvent in paints or the like.

The resultant product is non-inflammable and has all the valuable cleaning properties of gasoline with the addition of the alkaline property whereby grease is saponified.

I claim:

1. In the process of producing a cleaning compound the step which comprises treating a mixture of gasoline and ammonium carbonate with chlorine in the presence of a solid catalyst.

2. The process of producing a cleaning compound which comprises treating a mixture of gasoline and ammonium carbonate with chlorine in the presence of a solid catalyst, and distilling the resulting compound and collecting the distillate.

3. The process of producing a cleaning compound which comprises treating a mixture of gasoline and ammonium carbonate with chlorine in the presence of a solid catalyst, distilling the resulting compound, and treating the distillate to remove moisture.

4. The process of producing a cleaning compound, solvent or the like which comprises treating a mixture of gasoline and ammonium carbonate with chlorine in the presence of a catalyst, distilling the resulting compound, and treating the distillate to remove moisture and free chlorine.

5. The process of producing a cleaning material, solvent or the like, which comprises treating gasoline with chlorine in the presence of a solid catalyst and ammonium carbonate acting to free ammonia, distilling the resulting liquid and collecting the distillate.

FERNANDO SOMOZA VIVAS.